United States Patent Office 3,702,349
Patented Nov. 7, 1972

3,702,349
LOW TEMPERATURE CURING PROCESS AND COATING COMPOSITIONS SUITABLE THEREFOR
Thomas R. Merlino, North Providence, R.I., and John H. Flickinger, Houston, and Russell T. McFadden, Freeport, Tex., assignors to The Dow Chemical Company, Midland, Mich.
No Drawing. Filed Apr. 29, 1970, Ser. No. 33,036
Int. Cl. C08g 45/04
U.S. Cl. 260—830 R    27 Claims

ABSTRACT OF THE DISCLOSURE

Coatings may be cured by this process below 50° F. and at temperatures as low as −10° F. Suitable coating compositions comprise a solution in an inert organic solvent of (1) a polyaziridinyl adduct having more than one aziridinyl hydroxyalkyl group per molecule and (2) a coreactant which may be a dicarboxylic acid anhydride or a polyfunctional material having more than one anhydride, oxirane, thiol, sulfonic acid or carboxylic group per molecule.

BACKGROUND OF THE INVENTION

The subject matter of this invention relates to coating compositions which have the desirable and unexpected property of curing at low temperatures. The compositions utilize certain polyaziridinyl adducts in combination with a dicarboxylic acid anhydride or a polyfunctional material having more than one group per molecule which is reactive with the aziridinyl group.

Known coating compositions which contain coreactive materials, such as an epoxy resin and a curing agent, normally require the application of heat to cure same and are commonly referred to as thermosettable. In many instances curing is an exothermic reaction, e.g. polyepoxides, polyesters, polyurethanes, etc., which aids in the curing reaction. While some such coating compositions may be cured at room temperature or even as low as 50° F., there is an unfilled need for coating compositions which will cure at temperatures below 50° F.

Bulbenko et al. in U.S. 3,329,674 and U.S. 3,479,337 disclose the preparation of certain aziridinyl compounds and their use with carboxyl containing polymers as elastomeric binders for solid rocket fuels.

Strother in U.S. 3,346,533 and U.S. 3,303,144 describes the use of bis[2-(1-aziridinyl)ethyl]benzene, certain other bis aziridines and N-(2-hydroxy alkyl)aziridines (monofunctional) as useful in curing polyepoxide resins. Cures were effected at temperatures of 75° F. or higher.

SUMMARY OF THE INVENTION

Low temperature curing processes and coating materials are particularly desirable but difficult to obtain. The subject matter of this invention concerns compositions suitable for coating a wide variety of substrates and which have the advantageous and unexpected benefit of being curable at temperatures below 50° F. and at temperatures as low as −10° F.

Coating compositions suitable for use in the process herein comprise an inert, volatile organic solvent solution of (1) a polyaziridinyl adduct having more than one aziridinyl hydroxyalkyl group per molecule and (2) a coreactant which may be a dicarboxylic acid anhydride or a polyfunctional material having more than one reactive oxirane group, anhydride group, thiol group, sulfonic acid group, or carboxylic acid group per molecule.

The polyaziridinyl adduct is combined with the coreactant in the proportions on an equivalent basis of about 0.5/1.0 to 2.0/1.0 respectively. Preferably the components are combined to have an equivalent amount of an aziridinyl group per each reactive group.

DETAILED DESCRIPTION OF THE INVENTION

It should be understood that while the coating compositions of this invention are curable at temperatures below about 50° F. and substantially below the freezing point of water they may also be readily cured at temperatures of 50° F. or higher.

Coatings prepared from the compositions and process of this invention are useful, by the addition of pigments and the like, in preparing paints but are also useful as adhesives, in preparing laminates, as binders, for impregnating fabrics and for other coating purposes. Films may also be prepared. Maintenance and construction people especially in the more northern climates will recognize the benefits and advantages for these coating compositions.

The coating and film forming process comprises the steps of preparing a solution containing a polyaziridinyl adduct and a coreactant which are more fully described hereinafter, applying the solution in a filmiform layer and allowing the solvent to evaporate and the coating to cure by exposing the layer to a temperature below 50° F. for a time sufficient to effect a cure by coreaction of the components. Cure temperatures substantially below the freezing point of water and as low as −10° F. may be used herein.

The solutions require no special methods for their preparation. A variety of inert, volatile organic solvents are available and may be used to prepare solutions of the coating composition components. Depending on the ultimate purpose the solutions may be prepared as either low or high solids content solutions. The viscosity is readily adjusted for ease of application by the choice of solvents, the type of each component (molecular weight, etc.) and the proportions of each.

Typical solvents include aromatics such as benzene, toluene, xylene, ethyl benzene and the like, lower alcohols, glycol ethers, dioxane, tetrahydrofuran, esters, ketones and the like. Mixtures of solvents may also be used and frequently are preferred. In general the solvent need only be inert to the coating components dissolved therein and be volatile at the temperature of curing. Chlorinated hydrocarbon solvents and organic acids should be avoided since they are not inert and will react with the aziridinyl group.

The filmiform layer may be formed by any convenient method such as spraying, applying by brush or a roll, dipping, etc., all of which are well known to the art and need no detailed description herein.

Polyaziridinyl adducts having more than one aziridinyl hydroxyalkyl group per molecule comprise one of the reactive components of the coating compositions. Said adduct is conveniently prepared by reacting an alkylenimine with a polyepoxide having more than one glycidyl group per molecule whereby aziridinyl hydroxyalkyl groups are formed.

The reaction between the alkylenimine and the glycidyl group to produce an aziridinyl hydroxy propyl group can be shown with ethylenimine.

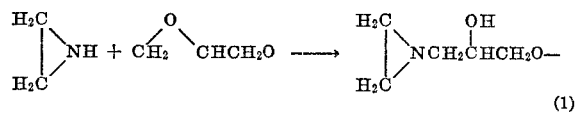

(1)

The polyaziridinyl adduct is prepared employing such a reaction by combining at least about one mole of alkylenimine per glycidyl group and heating at moderate temperatures. The reaction is best run in an inert aromatic

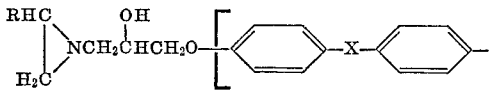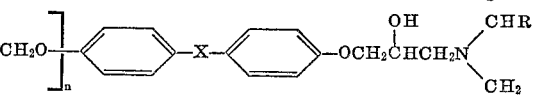

(2)

hydrocarbon solvent such as toluene although other inert solvents or solvent mixtures may be used. Excesses of the alkylenimine to ensure completeness of reaction may be used since the excess alkylenimine may be removed by distillation and/or use of a vacuum and the like. The reaction may take several hours or more depending on the temperature employed. Reaction temperatures in the range of 50 to 80° C. are satisfactory although lower and higher temperatures may be used.

Alkylenimines useful in preparing the polyaziridinyl adducts include ethylenimine and propylenimine which are readily available but other alkylenimines containing an alkyl substituent of up to 8 carbon atoms may also be used.

Polyepoxides having more than one glycidyl group per molecule may be employed to prepare the polyaziridinyl adducts of this invention. Included within the useful polyepoxides are those wherein the glycidyl group is attached to the resin by an oxygen atom (a glycidyl ether), a sulfur atom (a gycidyl thioether), a carbonyl (a glycidyl ester) and a nitrogen atom (a glycidyl amide or amine). The above polyepoxides and their preparation are well known to the art and are fully disclosed in Chapter 2, "Handbook of Epoxy Resins," H. Lee and K. Neville, McGraw-Hill Book Co., New York, 1967. Many other technical articles and patents further describe these polyepoxides.

In general the polyglycidyl ethers of polyhydric alcohols and polyhydric phenols are preferred. Most preferred are the polyglycidyl ethers of dihydric alcohols or dihydric phenols. Resins based on the dihydric phenol, bisphenol A, are the most common resins of this type.

Briefly, for purposes of illustration, polyglycidyl ethers are most conveniently prepared by reacting an epihalohydrin, usually epichlorohydrin, with the polyhydric alcohol or phenol by heating in the presence of a sufficient amount of an alkali to combine with the halogen of the halohydrin. Frequently an excess of alkali will be utilized. Theoretically one mole of epichlorohydrin will react with each hydroxyl group forming a glycidyl ether in the presence of the alkali. However, the proportions of the epihalohydrin to the hydroxyl may vary from a large excess to less than stoichiometric. In the latter case higher molecular weight products usually result from the interaction of the excess polyhydric compound with the polyglycidyl ethers. In any event the resulting product is not wholly one type of polyglycidyl ether but usually consists of a mixture of resins of varying molecular weights which have more than one glycidyl ether group per molecule. For this reason most commercially available resins are mixtures of different molecular weight polyglycidyl ethers. It is meant to include such mixtures within the term, polyglycidyl ethers herein.

Typical polyhydric alcohols include the aliphatic diols, triols, etc. such as 1,4-butanediol, neopentyl glycol, and the like as well as the glycols and polyglycols such as the polyethylene oxide and polypropylene oxide types. A variety of such polyhydric alcohols are known in addition to those cited and would be obvious to a skilled worker.

Polyhydric phenols include the mononuclear phenols such as resorcinol, catechol, hydroquinone, phloroglucinol and the like. Also included are the polynuclear phenols and most preferred are the glycidyl polyethers prepared from bisphenol A. Other polynuclear phenols include p,p'-dihydroxy diphenyl oxide; p,p'-dihydroxy diphenyl sulfone; p,p'-dihydroxybenzophenone and the like.

Preferred polyaziridinyl adducts include those prepared from polyglycidyl ethers of dihydric phenols wherein species according to the following formula may be present, usually as a mixture of different molecular weights.

wherein R is hydrogen or an alkyl group of 1 to 8 carbons, $n$ is an integer between 0 and about 200 but usually between 0 and 20 and most usually between about 0 and about 10, and X may be

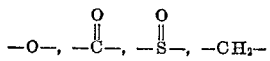

$-C(CH_3)_2-$, $-S-$, $-SS-$ or $-C(CH_2CH_3)_2-$. Most preferred are the adducts wherein X is $-C(CH_3)_2-$ (i.e. based on bisphenol A), and because the polyaziridinyl adducts are usually mixtures, the average value of $n$ for the mixture may be a fractional number.

Coreactants which may be combined with the polyaziridinyl adduct include a dicarboxylic acid anhydride and a polyfunctional material having more than one anhydride, oxirane, thiol, sulfonic acid or carboxylic acid group per molecule. Each of these groups are reactive with an aziridinyl group.

A preferred coreactant is a polyfunctional material having more than one oxirane group per molecule. These materials are more commonly known as polyepoxides and include all the polyepoxides having more than one glycidyl group per molecule previously discussed, but also includes polyepoxide resins having a different kind of an oxirane group than a glycidyl group. For example, certain polyepoxides are prepared by the well known method of epoxidation of unsaturated groups, and the like.

A variety of curing agents such as amines, acids, anhydrides, etc. are known in the prior art for use with the above polyepoxides. However, these curing agents cause an exothermic curing reaction and are generally useful only at elevated temperatures or at least at about 50° F. The ability of the compositions of this invention to not only effect good cures in the commonly used temperature ranges but to also effect full cures without an appreciable exotherm at temperatures well below the freezing point of water is completely unexpected and very desirable.

Other coreactants which cure at low temperatures with said polyaziridinyl adduct include polythiols, polysulfonic acids, polycarboxylic acids, and anhydrides. The polythiols that may be used according to this invention are characterized by, but not limited thereto, the following generalized structures:

(a) $HS(C_2H_4OCH_2OC_2H_4-S-S)_nC_2H_4OCH_2-C_2H_4-SH$ (b)
$$R-[O(C_3H_6-O_n)CH_2-\underset{OH}{CH}-CH_2-SH]_m$$

(c)
$$HSCH_2-\underset{OH}{CH}-CH_2\left(O-CH_2-\underset{CH_3}{CH}\right)_nO-CH_2-\underset{O}{\overset{H}{C}}-CH_2-SH$$
$$\underset{\underset{\underset{SH}{CH_2}}{\underset{HC-OH}{CH_2}}}{}$$

Polysulfonic acids may be prepared by sulfonation of polymers to introduce more than one sulfonic acid group or by the preparation of polymers containing sulfonic acid groups utilizing such monomers as styrene sulfonic acid, 2-sulfoethyl methacrylate and the like.

Both mono- and polyanhydrides may be used as a coreactant according to this invention. A variety of monoanhydrides such as phthalic anhydride, succinic anhydride, itaconic anhydride, maleic anhydride, nadic methyl anhydride and the like may be used. Polyanhydrides include pyromellitic dianhydride, cyclopentane tetracarboxylic dianhydride, benzophenone tetracarboxylic dianhydride and copolymers such as styrene-maleic anhydride, ethylene-maleic anhydride, methyl vinyl ether-maleic anhydride and the like.

Polyfunctional carboxylic acids useful as coreactants in this invention are copolymers of vinyl acids, such as acrylic, methacrylic, or itaconic acid, with other vinyl monomers such as styrene, butyl acrylate, vinyl chloride, methyl methacrylate, and the like. These copolymers are commonly prepared in solvents of the kind used in preparing the polyaziridinyl adducts of this invention and are well known to those skilled in the art. Also useful are polyfunctional acids such as phthalic acid and trimellitic acid.

In general the polyaziridinyl adduct and the coreactants are combined within proportions on an equivalent basis of about 0.5/1.0 to 2.0/1.0 respectively. It is generally preferred to combine the components so as to have one aziridinyl group present in the solution for each glycidyl, thiol, sulfonic acid, carboxylic acid, or anhydride group.

The following non-limiting examples further illustrate the present invention. All parts and percentages are by weight unless otherwise specified. The aziridinyl equivalent weight may be determined by titration of a weighed amount of the polyaziridinyl adduct in solution with either p-toluene sulfonic acid or tetrabutyl ammonium iodide.

EXAMPLE 1

A polyaziridinyl adduct was prepared by mixing together in a 5 liter flask 1598 gms. of toluene, 258 gms. of ethylenimine and 1340 gms. of 75% solution in toluene of a polyglycidyl ether of bisphenol having an epoxide equivalent weight of 670 (solution basis). The mixture was heated at 70° C. for 18 hours. The clear solution was distilled until 1128 gms. of distillate was removed and then 110 gms. of ethylene glycol monoethyl ether and 110 gms. of propylene glycol monomethyl ether were added and mixed with the adduct solution.

The final solution contained 49.5% solids, had a viscosity of 350 cps., an aziridinyl equivalent weight of 1030 (solution basis) and had a pale yellow color.

A first mixture was prepared from 20 gms. of the above adduct solution, 0.5 gm. of a silicone leveling agent (DC-840) as a 60% solution in toluene and 7 gms. of an 80/20 mixture of methyl ethyl ketone and ethylene glycol monoethyl ether to give a solution containing 37.5% solids.

A second mixture was prepared by mixing 12.4 gms. of a 75% solution in toluene of a polyglycidyl ether of bisphenol A having an epoxide equivalent weight of 700 (solution basis) with 15.4 gm. of the above 80/20 solvent mixture having dissolved therein 0.19 gm. of p-toluene sulfonic acid monohydrate to give a solution containing 33.9% solids.

The two mixtures were stored separately in capped bottles over night at −10±2° F. The next morning the two mixtures were combined with stirring and applied to cold-rolled steel panels (chilled at −10° F.) using a No. 50 Meyer rod yielding a coating of 0.7–0.8 mil (dry). The panels were maintained at −10° F. for 9 days and periodic checks were made for extent of cure.

After six hours the films weer dry to touch and tack free in 7 hours. Degree of cure was checked by the common pencil hardness test and a methyl ethyl ketone (MEK) swab test. In the latter if no cure has taken place and only evaporation of solvent the film would be quickly marred or disturbed by merely rubbing a cotton cloth or swab saturated with MEK across the film. No effect would be found with a cured film. The results are summarized below.

| Film property | Days at −10° F. | | | |
|---|---|---|---|---|
| | 1 | 3 | 7 | 9 |
| MEK resistance | Complete failure. | Marring | No effect | No effect. |
| Pencil hardness | 5B | 2B | B | B. |

Cure at this temperature has taken place as evidenced by the MEK resistance and increase in pencil hardness. Films of the above mixture were also cured at 75° F. to hard, solvent resistant films.

EXAMPLE 2

A series of comparative films were made in the manner of Example 1 to compare low temperature curability of conventional polyepoxide curing agents to the polyaziridinyl adduct of this invention.

Two different polyaziridinyl adducts were prepared from ethylenimine similar to Example 1 using a bisphenol-based liquid polyepoxide having an epoxide equivalent weight (EEW) of 190 (D.E.R. 331) in one case (A–1), and in another case, (A–2) a solid bisphenol A-based polyepoxide having an EEW of 595 (D.E.R. 671) with the following properties as prepared, respectively.

| | A–1 | A–2 |
|---|---|---|
| Percent resin solids | 50 | 50 |
| Appearance | (¹) | (²) |
| Viscosity, cps | | 350 |
| Aziridinyl equiv. wt | 504 | 1,030 |
| Percent epoxide | Nil | Nil |
| Percent ethylenimine | Nil | Nil |

¹ Clear, light yellow.
² Clear, yellow.

Confirmation that the desired adduct was obtained in similar cases was obtained by infrared analysis.

A series of tests similar to Example 1 were made to evaluate the above curing agents and a number of commonly used polyepoxide hardeners for low temperature curability. Casting mixtures were prepared with D.E.R. 331 and two additional tests with A–1 and A–2 combined with D.E.R. 671. The mixtures were prepared to contain approximately equivalent amounts of aziridinyl groups and epoxide (oxirane) groups or with commercial hardeners, the proportions were those recommended by the manufacturer. The cast films were cured at 30° F.

The following hardeners did not cure cast films of D.E.R. 331 at 30° F. as measured by the methyl ethyl ketone rub test and pencil hardness test:

(a) an amine hardener prepared by reacting equal amounts of D.E.R. 331 and diethylene triamine.
(b) a polyamide (D.E.R. 12) which essentially is a linear condensation product of a long-chain dibasic acid and diethylene triamine.
(c) bis(2-aziridinyl ethyl) benzene (ref. U.S. 3,346,533).
(d) hardener (a) plus phenethyl aziridine (ref. U.S. 3,-171,826).

The following aziridinyl compounds did not cure within seven days at 75° F.

(a) 2-hydroxyethyl aziridine (ref. U.S. 3,303,144).
(b) 2-hydroxypropyl aziridine (ref. U.S. 3,303,144).
(c) 2-phenethyl aziridine.

Certain curing agents proposed as low temperature curing agents were also included in these tests.

Epicure 862, a commercially available hardener containing thiol groups, is characterized by the following structure:

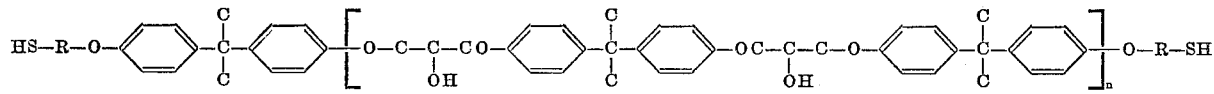

where R is a bivalent aliphatic group.

Epicure 861 is a similar product to Epicure 862 but additionally contains a tertiary amine as an accelerator. Accelerated MDA is methylene dianiline containing salicylic acid. The results with these hardeners and the adducts of this invention are shown in Table I. The ability of said polyaziridinyl adducts to cure the polyepoxides at 30° F. is evident and the inferior results with the commercial hardeners is to be noted.

From the above it is clear that acidic catalysts, while they accelerate the film cures at low temperatures, are not essential to the development of useful film properties within practical time limits.

EXAMPLE 4

Similar results were also found when the polyepoxide resins in the casting mixtures above (D.E.R. 331 or D.E.R. 671) were replaced by an equivalent amount of each of the resins as shown in the following description:

Polyepoxide Resin I.—N,N-bis(2,3-epoxy propyl)-O-2,3-epoxy propyl p-aminophenol (ref. U.S. 3,235,421);
Polyepoxide Resin II.—an epoxy novolac resin having an epoxide equivalent weight of 175–182 (D.E.N. 438).

Two polyaziridinyl adducts were made in the manner described in Example 1 from D.E.R. 331 and ethylenimine. They are designated C-1 and C-3. In the same way adducts were made from D.E.R. 671 and ethylenimine, and are designated C-2 and C-4. These resin solutions had the following properties:

TABLE I

| | Formulation using the polyaziridinyl adducts of this invention. | | | | Formulation using the prior art hardeners | | |
|---|---|---|---|---|---|---|---|
| | 1 | 2 | 3 | 4 | 5 | 6 | 7 |
| Components, parts by wt. in grams: | | | | | | | |
| D.E.R 331 | 7.2 | 3.4 | | | 20 | 20 | 20 |
| D.E.R. 671 [1] | | | 26.6 | 12.4 | | | |
| Adduct A-1 | 20.0 | | 20.0 | | | | |
| Adduct A-2 | | 20.0 | | 20.0 | | | |
| Epicure 861 | | | | | 20 | | |
| Epicure 862 [2] | | | | | | 20 | |
| Accelerated MDA | | | | | | | 11.7 |
| p-Toluene sulfonic acid | 0.17 | 0.13 | 0.27 | 0.19 | | | |
| Diluent: | | | | | | | |
| MEK | 8.9 | 11.9 | 16.0 | 18.0 | 21.4 | 21.4 | 17.0 |
| EE | 2.2 | 3.0 | 4.0 | 4.4 | 5.3 | 5.3 | 4.1 |
| DC 840 | 0.5 | 0.5 | 0.5 | 0.5 | | | |
| Percent solids in mixture | 45 | 35 | 45 | 35 | 60 | 60 | 60 |
| Tack-free time, hrs | 3–5 | 3–5 | 3–5 | 3–5 | 1½ | 1½ | 22 |
| Pot life at 30° F. hrs | 7–19 | 20 | 22 | 30 | [3] 3 | [3] 3 | [4] 1 |
| MEK rub: | | | | | | | |
| 4–5 hrs | CF | SM | CF | CF | CF | CF | CF |
| 20–24 hrs | NE | NE | SM | SM | CF | CF | CF |
| 45–50 hrs | NE | NE | NE | NE | CF | CF | CF |
| 140–170 hrs | NE | NE | NE | NE | SM | CF | CF |
| Pencil hardness: | | | | | | | |
| 4–5 hrs | <6B | 5B | <6B | 5B | B | 5B | <6B |
| 20–24 hrs | B | HB | 2B | B | B | 5B | <6B |
| 45–50 hrs | HB | F | HB | B | HB | 5B | 2B |
| 140–170 hrs | HB | F | HB | HB | HB | 4B | HB |

[1] Grams of a 75% solids solution in xylene/methyl isobutyl ketone.
[2] Containing 1% tetramethyl guanadine.
[3] Days.
[4] Week.

NOTE.—MEK=methyl ethyl ketone; EE=ethylene glycol monoethyl ether; CF=complete failure; SM=slight marring; NE=no effect.

EXAMPLE 3

Tests similar to those of the preceding examples were made in which no p-toluene sulfonic acid catalyst was added. Adduct B–1 was prepared from ethylenimine and D.E.R. 331 as in Example 1 and had an aziridinyl equivalent weight of 440, solution basis, and contained 55% solids. Adduct B–2 was prepared from ethylenimine and D.E.R. 671 and had an aziridinyl equivalent weight of 1140, solution basis and contained 50% solids. In making the mixtures D.E.R. 331 and D.E.R. 671 (75% solids solution in 65/35 xylene/methyl isobutyl ketone) were combined with the adduct employing a diluent (80/20 mixture of MEK/propylene glycol monomethyl ether). The recipes are shown in Table II. The mixtures were cast to give a 1 mil dry film on pre-chilled steel panels and then cured at 30° F.

TABLE II

| | 1 | 2 | 3 | 4 |
|---|---|---|---|---|
| Components, parts by weight, grams: | | | | |
| D.E.R. 331 | 19.8 | | 11.2 | |
| D.E.R. 671 (75% solids in xylene/MIBK) | | 41.0 | | 28.8 |
| Adduct B–1 (55% solids) | 45.8 | 25.8 | | |
| Adduct B–2 (50% solids) | | | 67.6 | 46.8 |
| Diluent | 34.4 | 33.2 | 21.2 | 24.4 |
| Percent solids of mixture | 45 | 45 | 45 | 45 |
| Film properties: | | | | |
| Tack-free time, hours | 2–3 | 2–3 | 2–3 | 2–3 |
| Pot-life (at 30° F.), hrs | 48 | 120 | 48 | 72 |
| MEK rub: | | | | |
| 4–5 hours | CF | CF | CF | CF |
| 20–24 hours | NE | CF | SM | M |
| 45–50 hours | NE | NE | NE | NE |
| 140–170 hours | NE | NE | NE | NE |
| Pencil hardness: | | | | |
| 4–5 hours | 6B | <6B | 6B | 6B |
| 20–24 hours | B | B | 2B | 2B |
| 140–170 hours | HB | F | F | HB |

NOTE.—M=marring.

| | Percent solids | Equivalent wt. |
|---|---|---|
| Polyaziridinyl adduct: | | |
| C–1 | 55 | 440 |
| C–2 | 45 | 1,285 |
| C–3 | 50 | 505 |
| C–4 | 50 | 1,030 |

The Epoxy Resins I and II and polyaziridinyl adducts C–1, C–2, C–3, and C–4 were formulated into coatings on chilled steel, and allowed to cure at 30° F. The formulations and film properties are shown in Table III.

TABLE III

| Component, parts by wt., gms.: | Formulation | | | |
|---|---|---|---|---|
| | 1 | 2 | 3 | 4 |
| Polyaziridinyl adduct: | | | | |
| C-1 | 50.9 | | | |
| C-2 | | 75.8 | | |
| C-3 | | | 20.0 | |
| C-4 | | | | 20.0 |
| Polyepoxide resin: | | | | |
| I | 12.0 | 5.9 | | |
| II | | | 6.8 | 3.1 |
| p-Toluenesulfonic acid | | | 0.16 | 0.13 |
| Diluent, EE | 37.1 | 8.3 | { 18.5 | [1] 11.5 |
| | | | 2.1 | 2.9 |
| DC-840 [2] | | | 0.5 | 0.5 |
| Percent solids | 40 | 40 | 45 | 35 |
| Tack-free time, hours | 3 | 3 | 3-5 | 3-5 |
| Pot life, hrs | [3] 3-6 | [3] 7 | 7-19 | 22 |
| MEK rub after: | | | | |
| 4-5 hours | CF | CF | CF | M |
| 20-24 hours | SM | CF | NE | NE |
| 45-50 hours | NE | CF | NE | NE |
| 140-170 hours | NE | NE | NE | NE |
| Pencil hardness after: | | | | |
| 4-5 hours | | | <6B | 5B |
| 20-24 hours | HB | 2B | 2B | B |
| 45-50 hours | F | F | B | F |
| 140-170 hours | 2H | 2H | B | F |

[1] MEK.
[2] Silicone fluid.
[3] Days.

EXAMPLE 5

The compositions of this invention also cure well at elevated temperatures.

A polyaziridinyl adduct similar to Example 1 was prepared initially as a 63% solids solution and was then diluted to 50% solids by the addition of methyl ethyl ketone (MEK). The resulting solution had an aziridinyl equivalent weight of 525 and was designated D-1.

For preparing the casting mixtures a polyepoxide resin solution was prepared as a 75% solution of an epoxy novolac resin in MEK/ethylene glycol monoethyl ether (76/24). The solution had an epoxide equivalent weight of about 240. Films were cast as before and cured for 20 minutes at 250° F. The results are shown in Table IV.

TABLE IV

| | 1 | 2 | 3 |
|---|---|---|---|
| Component, parts by weight, grams: | | | |
| Polyaziridinyl adduct D-1 | 100 | 110 | 110 |
| Polyepoxide solution | 62 | 50 | 40 |
| Ratio of aziridine/epoxide | 74/100 | 100/100 | 125/100 |
| Film properties: | | | |
| Thickness (mils) | 1.8-2.0 | 1.8-2.0 | 1.8-2.0 |
| Hardness (Knoop) | 23.0 | 23.9 | 25.0 |
| Adhesion | Good | Fair | Fair |
| Resistance to: | | | |
| 10% acetic acid | 144 hrs | 168 hrs., NE | 168 hrs., NE |
| Glacial acetic acid | 8-24 hrs | 36-48 hrs | 72 hrs |
| 10% nitric acid | 168 hrs., NE | 168 hrs., NE | 168 hrs., NE |
| 50% nitric acid | 8-24 hrs | 8-24 hrs | 8-24 hrs |
| MEK | 144 hrs | 168 hrs., NE | 168 hrs., NE |
| Water | 1 week, NE | 1 week, NE | 1 week, NE |

EXAMPLE 6

Casting solutions were prepared from polyaziridinyl adducts as described below and nadic methyl anhydride (NMA) and films prepared therefrom were cured at 30° F.

A polyaziridinyl adduct solution similar to Example 1 was prepared from D.E.R. 331 and ethylenimine, and had the following properties: 55% resin solids, viscosity 230 centipoise, equivalent weight, 440. It was designated E-1.

A second polyaziridinyl adduct solution similar to B-2 of Example 2 was prepared from D.E.R. 661 and ethylenimine, and had the following properties: 50% resin solids and equivalent weight 1140. It was designated E-2.

The polyaziridinyl adduct solutions E-1 and E-2 were chilled to 30° F. and mixed with nadic methyl anhydride, also at 30° F. The solutions were cast as 1. mil dry films on steel chilled to 30° F. and allowed to cure. The formulations and film properties are shown in Table V.

TABLE V

| | 1 | 2 |
|---|---|---|
| Components, parts by wt. grams: | | |
| NMA | 16.1 | 6.9 |
| E-1 | 79.8 | |
| E-2 | | 86.2 |
| Propylene glycol monomethyl ether | 4.1 | 6.9 |
| Pot life, hours | ¼ | ¼ |
| Tack-free, time, min | 30 | 30 |
| Pencil hardness: | | |
| 1½ hrs | 5B | <6B |
| 12 hrs | HB | 2B |
| 168 hrs | 2H | HB |
| MEK rub: | | |
| 1½ hrs | (¹) | (¹) |
| 168 hrs | (¹) | (¹) |

[1] No effect.

Similar results to the above are obtained when the nadic methyl anhydride is replaced with an equivalent amount (anhydride basis) of a copolymer of styrene-maleic anhydride.

EXAMPLE 7

Polyaziridinyl adducts made from bisphenol A diglycidyl ether resins were prepared as previously described in Example 1, one having an aziridinyl equivalent weight of 440 (on a solution basis, 55% solids) and the other 1285, at 45% solids. The first resin solution is designated F-1 and the second, F-2.

A carboxylated acrylic solution polymer was prepared by heating the following mixture at 80° C. for 18 hours, with stirring, in a glass 2-liter reactor:

| | Gms. |
|---|---|
| Propylene glycol monomethyl ether | 500 |
| Butyl acrylate | 250 |
| Methyl methacrylate | 200 |
| Methacrylic acid | 50 |
| Azobis(isobutyronitrile) | 5 |

The polymer solution was clear and colorless, and had a carboxyl content ($CO_2H$) of 2.61% and a resin solids content of 49%. The solution was designated as C. The three solutions were used in formulating coatings systems as follows:

| | 1 | 2 |
|---|---|---|
| Polyaziridinyl adduct: | | |
| F-1, gms | 11.5 | |
| F-2, gms | | 26.9 |
| Carboxyl acrylic polymer solution, gms | 47.4 | 35.8 |
| Ethylene glycol monoethyl ether, gms | 41.1 | 37.3 |
| Percent resin solids of mixture | 30.0 | 30.0 |

The above blends were made by diluting the polyaziridinyl adduct solution with half of the glycol ether, and the carboxylated polymer solution with the other half, chilling the two solutions to 30° F. and mixing the two just prior to use.

Films of the solution mixture were cast with a No. 38 Meyer rod on standard Q panels which had been pre-chilled to 30° F. The films were allowed to cure at 30° F. and tested as shown below after various periods of time.

|  | 1 | 2 |
|---|---|---|
| Gel time of mixture, hours | 4½ | 7 |
| Tack-free time, hours | 1½ | 1½ |
| MEK rub after: |  |  |
| 4 hours | CF | CF |
| 24 hours | CF | CF |
| 48 hours | NE | SM |
| 168 hours | SM | SM |
| Pencil hardness after: |  |  |
| 24 hours | HB | 2B |
| 48 hours | H— | 2B |
| 168 hours | 3H | 2H |

NOTE.—CF=complete failure; SM=slight marring; NE=no effect.

From the above it can be seen that these compositions are capable of curing in thin films at low temperatures to give protective coatings which are resistant to physical abrasion and attack by solvents.

The compositions of this invention fully cure to a hard solvent resistant film by merely standing at temperatures ranging from well below the freezing point of water and higher. As indicated, elevated temperatures may also be employed to cure same. The cure may be accelerated by including a catalytic amount of an acid catalyst in said compositions but the catalyst is not essential. Typical catalysts include p-toluene sulfonic acid, phosphoric acid, various phosphoric acid esters, such as di-2-ethylhexyl acid phosphate, and the like. Proportions of about 1% and lower up to about 5% are sufficient to accelerate the cure.

It will be understood that the present invention is not limited to the specific details described above but may embody various modifications insofar as they are defined in the following claims.

What is claimed is:

1. A low temperature curing process for the preparation of films and coatings which comprises
   (a) dissolving a polyaziridinyl adduct having more than one aziridinyl hydroxyalkyl group per molecule and a coreactant for said adduct in a volatile, inert organic solvent to provide a coating solution thereof, wherein said coreactant is a dicarboxylic acid anhydride or a polyfunctional material having more than one anhydride, oxirane, sulfonic acid or carboxylic acid group per molecule and wherein the proportions of said adduct to said coreactant on an equivalent basis ranges from about 0.5/1 to about 2/1, respectively;
   (b) applying said coating solution in a filmiform layer; and
   (c) allowing said solvent to evaporate and the coating composition to cure by exposing said layer to a temperature below about 50° F. for a time sufficient for said adduct and said coreactant to react.

2. The process of claim 1 wherein said solution contains about equivalent proportions of said adduct to said coreactant.

3. The process of claim 1 wherein said curing temperature ranges from about −10° F. to about 50° F.

4. The process of claim 1 wherein said polyaziridinyl adduct is prepared by reacting an alkylenimine with a polyepoxide having more than one glycidyl group per molecule in the proportions of at least about one mole of the alkylenimine per each glycidyl group.

5. The process of claim 4 wherein said polyepoxide is a polyglycidyl ether of a polyhydric alcohol or a polyhydric phenol.

6. The process of claim 5 wherein said polyepoxide is a polyglycidyl ether of a dihydric phenol.

7. The process of claim 6 wherein said dihydric phenol is bisphenol A.

8. The process of claim 4 wherein said alkylenimine is ethylenimine or propylenimine.

9. The process of claim 1 wherein said solution further contains an acid catalyst.

10. A composition which is curable at temperatures below 50° F. consists of a volatile, inert organic solvent solution of
    (a) a polyaziridinyl adduct having more than one aziridinyl hydroxyalkyl group per molecule, and
    (b) a coreactant which is a dicarboxylic acid anhydride or a polyfunctional material having more than one anhydride, oxirane, or sulfonic acid group per molecule;
        wherein the proportions of said adduct to said coreactant on an equivalent basis ranges from about 0.5/1 to about 2/1, respectively.

11. The composition of claim 10 wherein said polyaziridinyl adduct is prepared by reacting an alkylenimine with a polyepoxide having more than one glycidyl group per molecule in the proportions of at least about one mole of the alkylenimine per each glycidyl group.

12. The composition of claim 11 wherein said polyepoxide is a polyglycidyl ether of a polyhydric alcohol or a polyhydric phenol.

13. The composition of claim 12 wherein said polyepoxide is a polyglycidyl ether of a dihydric phenol.

14. The composition of claim 13 wherein said dihydric phenol is bisphenol A.

15. The composition of claim 11 wherein said alkylenimine is ethylenimine or propylenimine.

16. The composition of claim 10 wherein said solution contains about equivalent proportions of said adduct to said coreactant.

17. The composition of claim 10 wherein said coreactant is nadic methyl anhydride or a copolymer of styrene and maleic anhydride.

18. The composition of claim 10 wherein said coreactant is a polyepoxide having more than one glycidyl group per molecule.

19. The composition of claim 18 wherein said polyepoxide is a polyglycidyl ether of a polyhydric phenol or polyhydric alcohol.

20. The composition of claim 10 further consisting of a pigment.

21. The composition of claim 10 further consisting of an acid catalyst.

22. A composition which is curable at temperatures below 50° F. consists of a volatile, inert organic solvent solution of
    (a) a polyaziridinyl adduct of an alkylenimine and a polyglyicdyl ether of bisphenol A wherein said adduct has more than one aziridinyl hydroxyalkyl ether group per molecule, and
    (b) a polyepoxide having more than one glycidyl ether group per molecule;
        wherein the proportions of said adduct to said polyepoxide on an equivalent basis ranges from about 0.5/1 to about 2/1, respectively.

23. The composition of claim 22 wherein said alkylenimine is ethylenimine or propylenimine.

24. The composition of claim 22 wherein said polyepoxide is a polyglycidyl ether of a dihydric phenol.

25. The composition of claim 22 wherein said solution contains about equivalent proportions of said adduct to said polyepoxide.

26. The composition of claim 22 further consisting of an acid catalyst.

27. The composition of claim 22 further consisting of a pigment.

References Cited

UNITED STATES PATENTS 3,479,337  11/1969  Bulbenko et al. _____ 260—239
3,355,437  11/1967  Tesoro et al. _____ 260—2 EN WILLIAM H. SHORT, Primary Examiner T. E. PERTILLA, Assistant Examiner U.S. Cl. X.R.

106—311; 117—127; 161—186; 260—2 N, 30.4 EP, 33.6 Ep, 37 Ep, 47 EN, 59, 78.4 D, 79, 80.3 R